United States Patent
Sportelli et al.

(10) Patent No.: US 9,849,734 B2
(45) Date of Patent: Dec. 26, 2017

(54) PNEUMATIC TIRE WITH A THREE DIMENSIONAL COMPONENT

(71) Applicant: The Goodyear Tire & Rubber Company, Akron, OH (US)

(72) Inventors: Francesco Sportelli, Bettembourg (LU); David Ray Hubbell, Hartville, OH (US); Annette Lechtenboehmer, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 586 days.

(21) Appl. No.: 14/529,511

(22) Filed: Oct. 31, 2014

(65) Prior Publication Data

US 2016/0121663 A1    May 5, 2016

(51) Int. Cl.
| | |
|---|---|
| *B60C 15/00* | (2006.01) |
| *B60C 15/06* | (2006.01) |
| *B60C 9/18* | (2006.01) |
| *B60C 9/11* | (2006.01) |
| *B60C 9/02* | (2006.01) |

(52) U.S. Cl.
CPC ............ *B60C 15/0653* (2013.01); *B60C 9/11* (2013.01); *B60C 9/1807* (2013.01); *B60C 15/0632* (2013.01); *B60C 2009/0223* (2013.01); *B60C 2009/1828* (2013.01); *B60C 2015/0678* (2013.01); *B60C 2015/0689* (2013.01); *B60C 2015/0692* (2013.01); *B60C 2200/04* (2013.01)

(58) Field of Classification Search
CPC .. B60C 15/06; B60C 15/0628; B60C 15/0632
See application file for complete search history.

(56) References Cited

U.S. PATENT DOCUMENTS

| | | | |
|---|---|---|---|
| 4,090,546 A | 5/1978 | Honda et al. | |
| 4,153,095 A | 5/1979 | Sarkissian | |
| 4,169,494 A | 10/1979 | Kubica et al. | |
| 4,336,296 A * | 6/1982 | Fukuta ................... | B29C 70/24 |
| | | | 139/383 B |
| 4,456,048 A | 6/1984 | Markow et al. | |
| 4,523,619 A | 6/1985 | Gouttebessis | |

(Continued)

FOREIGN PATENT DOCUMENTS

| | | | |
|---|---|---|---|
| DE | 2038305 | * | 3/1971 |
| DE | 3640222 A1 | | 6/1987 |

(Continued)

OTHER PUBLICATIONS

Chinese Search Report (not dated) for Application Serial No. 201510720701.7.

(Continued)

*Primary Examiner* — Justin R Fischer
(74) *Attorney, Agent, or Firm* — Robert N. Lipcsik

(57) ABSTRACT

A pneumatic tire includes an axis of rotation, a carcass having at least one reinforced ply and a reinforcing structure providing a buffer for absorbing shear strain, a tread disposed radially outward of the carcass, and a belt structure disposed radially between the carcass and the tread. The reinforcing structure includes at least one layer of a three dimensional fabric including a frame structure of fabric and open cells defined by the frame structure.

9 Claims, 8 Drawing Sheets

(56) References Cited

U.S. PATENT DOCUMENTS

| | | | |
|---|---|---|---|
| 4,945,962 | A | 8/1990 | Pajtas |
| 5,170,364 | A | 12/1992 | Gross et al. |
| 6,029,725 | A | 2/2000 | Mani |
| 6,516,845 | B2 | 2/2003 | Nguyen et al. |
| 6,739,008 | B1 | 5/2004 | Kindrick |
| 7,314,840 | B2 | 1/2008 | Baychar |
| 7,614,436 | B2 | 11/2009 | Ternon et al. |
| 7,992,611 | B2 | 8/2011 | Imhoff et al. |
| 8,164,170 | B2 | 4/2012 | Ellis |
| 8,176,957 | B2 | 5/2012 | Manesh et al. |
| 8,196,240 | B2 | 6/2012 | Meyer et al. |
| 8,215,036 | B2 | 7/2012 | Auger et al. |
| 8,418,269 | B1 | 4/2013 | McBride |
| 8,474,074 | B2 | 7/2013 | O'Keefe et al. |
| 8,590,079 | B2 | 11/2013 | Habegger |
| 8,790,287 | B2 | 7/2014 | Evans |
| 2006/0162087 | A1 | 7/2006 | Chang |
| 2010/0065179 | A1 | 3/2010 | Imhoff et al. |
| 2012/0085474 | A1 | 4/2012 | Assaad |

FOREIGN PATENT DOCUMENTS

| | | | |
|---|---|---|---|
| EP | 0583614 A1 | | 2/1994 |
| JP | 2013-212825 | * | 10/2013 |

OTHER PUBLICATIONS

European Search Report dated Apr. 20, 2016 for Application Serial No. EP15190539.

* cited by examiner

PNEUMATIC TIRE WITH A THREE DIMENSIONAL COMPONENT

FIELD OF THE INVENTION

The present invention relates to a pneumatic tire, and more particularly, to a radial passenger tire or a high performance tire having a three dimensional spacer component.

BACKGROUND OF THE INVENTION

A pneumatic tire typically includes a pair of axially separated inextensible beads. A circumferentially disposed bead filler apex extends radially outward from each respective bead. At least one carcass ply extends between the two beads. The carcass ply has axially opposite end portions, each of which is turned up around a respective bead and secured thereto. Tread rubber and sidewall rubber is located axially and radially outward, respectively, of the carcass ply.

The bead area is one part of the tire that contributes a substantial amount to the rolling resistance of the tire, due to cyclical flexure which also leads to heat buildup. Under conditions of severe operation, as with runflat and high performance tires, the flexure and heating in the bead region can be especially problematic, leading to separation of mutually adjacent components that have disparate properties, such as the respective moduli of elasticity. In particular, the ply turnup ends may be prone to separation from adjacent structural elements of the tire.

A conventional ply may be reinforced with materials such as nylon, polyester, rayon, and/or metal, which have much greater stiffness (i.e., modulus of elasticity) than the adjacent rubber compounds of which the bulk of the tire is made. The difference in elastic modulus of mutually adjacent tire elements may lead to separation when the tire is stressed and deformed during use.

A variety of structural design approaches have been used to control separation of tire elements in the bead regions of a tire. For example, one method has been to provide a "flipper" surrounding the bead and the bead filler. The flipper works as a spacer that keeps the ply from making direct contact with the inextensible beads, allowing some degree of relative motion between the ply, where it turns upward under the bead, and the respective beads. In this role as a spacer, a flipper may reduce disparities of strain on the ply and on the adjacent rubber components of the tire (e.g., the filler apex, the sidewall rubber, in the bead region, and the elastomeric portions of the ply itself).

The flipper may be made of a square woven cloth that is a textile in which each fiber, thread, or cord has a generally round cross-section. When a flipper is cured with a tire, the stiffness of the fibers/cords becomes essentially the same in any direction within the plane of the textile flipper.

In addition to the use of flippers as a means by which to reduce the tendency of a ply to separate, or as an alternative, another method that has been used involves the placement of "chippers." A chipper is a circumferentially deployed metal or fabric layer that is disposed within the bead region in the portion of the tire where the bead fits onto the wheel rim. More specifically, the chipper lies inward of the wheel rim (i.e., toward the bead) and outward (i.e., radially outward, relative to the bead viewed in cross section) of the portion of the ply that turns upward around the bead. Chippers serve to stiffen, and increase the resistance to flexure of, the adjacent rubber material, which itself is typically adjacent to the turnup ply endings.

SUMMARY OF THE INVENTION

A pneumatic tire in accordance with the present invention has an axis of rotation, a carcass having at least one reinforced ply and a reinforcing structure providing a buffer for absorbing shear strain, a tread disposed radially outward of the carcass, and a belt structure disposed radially between the carcass and the tread. The reinforcing structure includes at least one layer of a three dimensional fabric including a frame structure of fabric and open cells defined by the frame structure.

According to another aspect of the pneumatic tire, the reinforcing structure is a flipper.

According to still another aspect of the pneumatic tire, the flipper separates the reinforced ply from a bead of the carcass.

According to yet another aspect of the pneumatic tire, the flipper acts as a strain-relieving layer between the bead and the reinforced ply.

According to still another aspect of the pneumatic tire, the fabric has warp yarns of 940/1 dtex polyaramide and weft yarns of 1220/1 dtex rayon.

According to yet another aspect of the pneumatic tire, the warp yarns have a density of 14 EPI and the weft yarns have a density of 12 EPI.

According to still another aspect of the pneumatic tire, the fabric has warp yarns with a density of 14 EPI and weft yarns have a density of 12 EPI.

According to yet another aspect of the pneumatic tire, the pneumatic tire is a radial runflat passenger tire.

According to still another aspect of the pneumatic tire, the pneumatic tire is a high performance tire.

According to yet another aspect of the pneumatic tire, the fabric comprises an open weave tape.

According to still another aspect of the pneumatic tire, outside edges of the open weave tape has a pair of warp yarns continuous for the radial length of the open weave tape.

According to yet another aspect of the pneumatic tire, the open weave tape further comprises an adhesion promoter disposed thereon.

According to still another aspect of the pneumatic tire, the reinforcing structure is a flipper having two or more layers of open weave tape.

According to yet another aspect of the pneumatic tire, the flipper includes warp yarns of at least two fibers of different fiber materials.

DEFINITIONS

"Apex" or "bead filler apex" means an elastomeric filler located radially above the bead core and between the plies and the turnup plies.

"Axial" and "Axially" mean the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Carcass" means the tire structure apart from the belt structure, tread, undertread over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"Flipper" refers to a reinforcing fabric around the bead wire for strength and to tie the bead wire in the tire body.

"Gauge" refers generally to a measurement and specifically to thickness.

"Inner Liner" means the layer or layers of elastomer or other material that form the inside surface of a tubeless tire and that contain the inflating fluid within the tire.

"Lateral" means a direction parallel to the axial direction.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Toe guard" refers to the circumferentially deployed elastomeric rim-contacting portion of the tire axially inward of each bead.

"Tread width" means the arc length of the tread surface in the plane includes the axis of rotation of the tire.

"Turnup end" means the portion of a carcass ply that turns upward (i.e., radially outward) from the beads about which the ply is wrapped.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF EXAMPLE EMBODIMENTS

Figure 1:
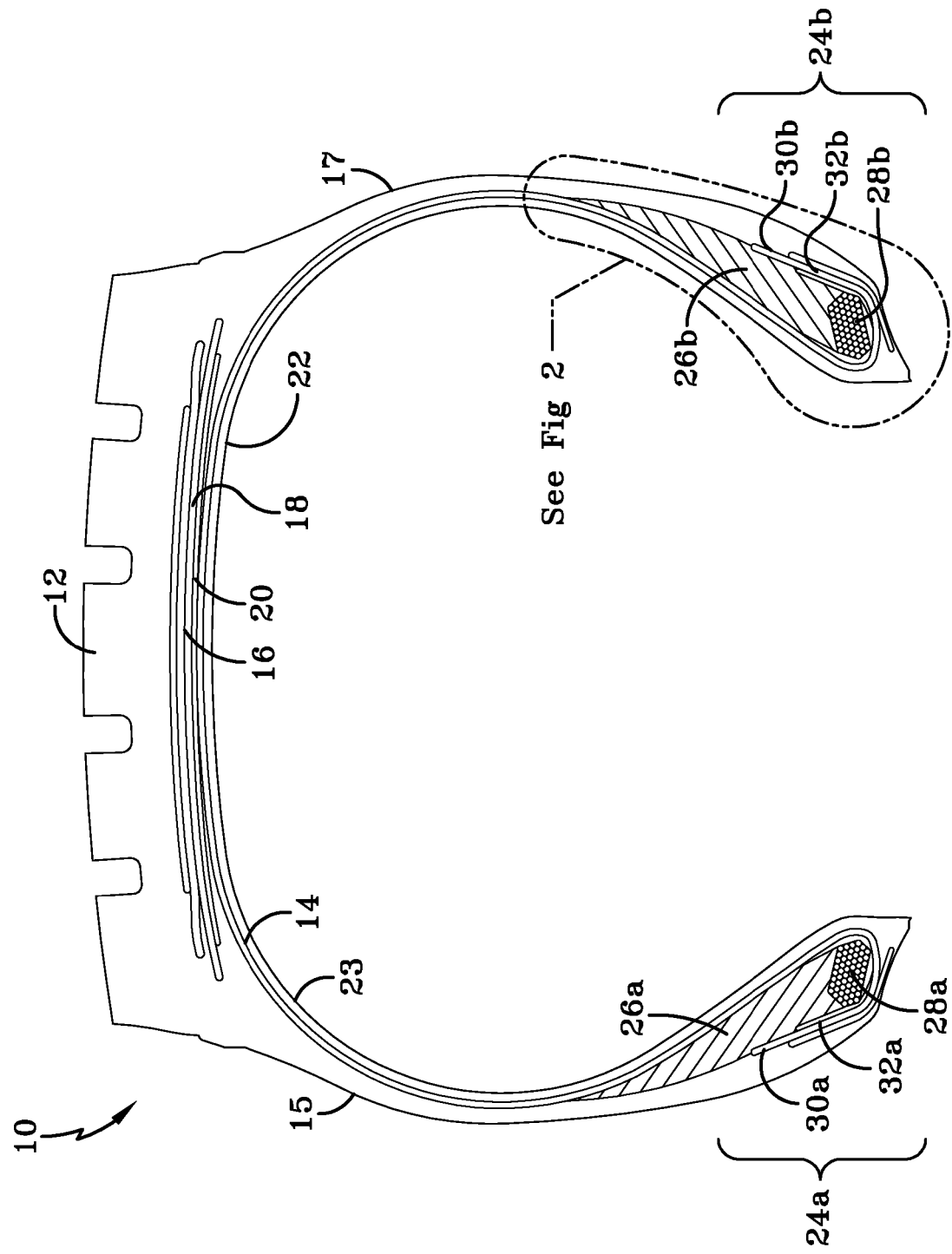
FIG. 1 represents a schematic cross-sectional view of an example tire for use with the present invention.
Figure 2:
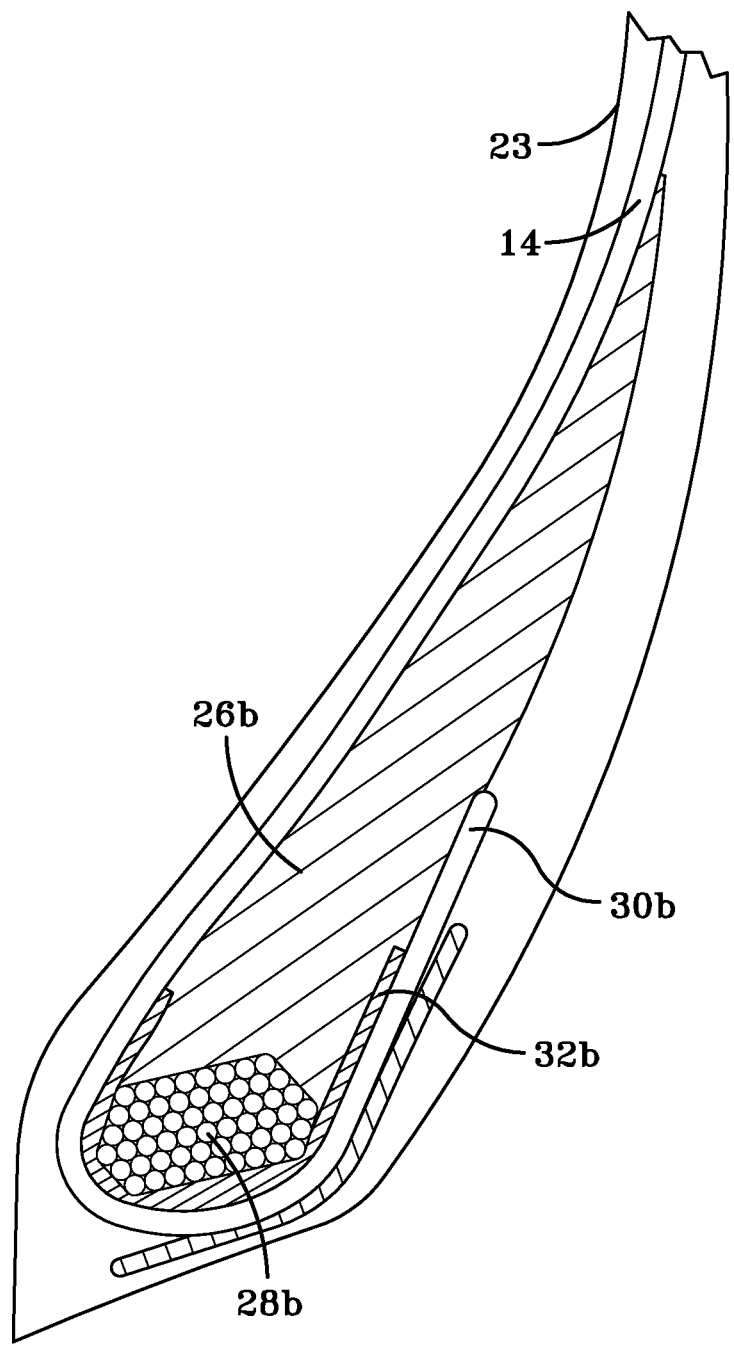
FIG. 2 represents a schematic detail view of the bead region of the example tire shown in FIG. 1.

FIG. 1 shows an example tire 10 for use with reinforcing components in accordance with the present invention. The example tire 10 has been described in U.S. Pat. No. 7,992,611, herein incorporated in its entirety by reference. The example tire 10 has a tread 12, an inner liner 23, a belt structure 16 comprising belts 18, 20, a carcass 22 with a single carcass ply 14, two sidewalls 15,17, and two bead regions 24a, 24b comprising bead filler apexes 26a, 26b and beads 28a, 28b. The example tire 10 is suitable, for example, for mounting on a rim of a passenger vehicle. The carcass ply 14 includes a pair of axially opposite end portions 30a, 30b, each of which is secured to a respective one of the beads 28a, 28b. Each axial end portion 30a or 30b of the carcass ply 14 is turned up and around the respective bead 28a, 28b to a position sufficient to anchor each axial end portion 30a, 30b, as seen in detail in FIG. 2.

The carcass ply 14 may be a rubberized ply having a plurality of substantially parallel carcass reinforcing members made of such material as polyester, rayon, or similar suitable organic polymeric compounds. The carcass ply 14 engages the axial outer surfaces of two flippers 32a, 32b.

Figure 3:
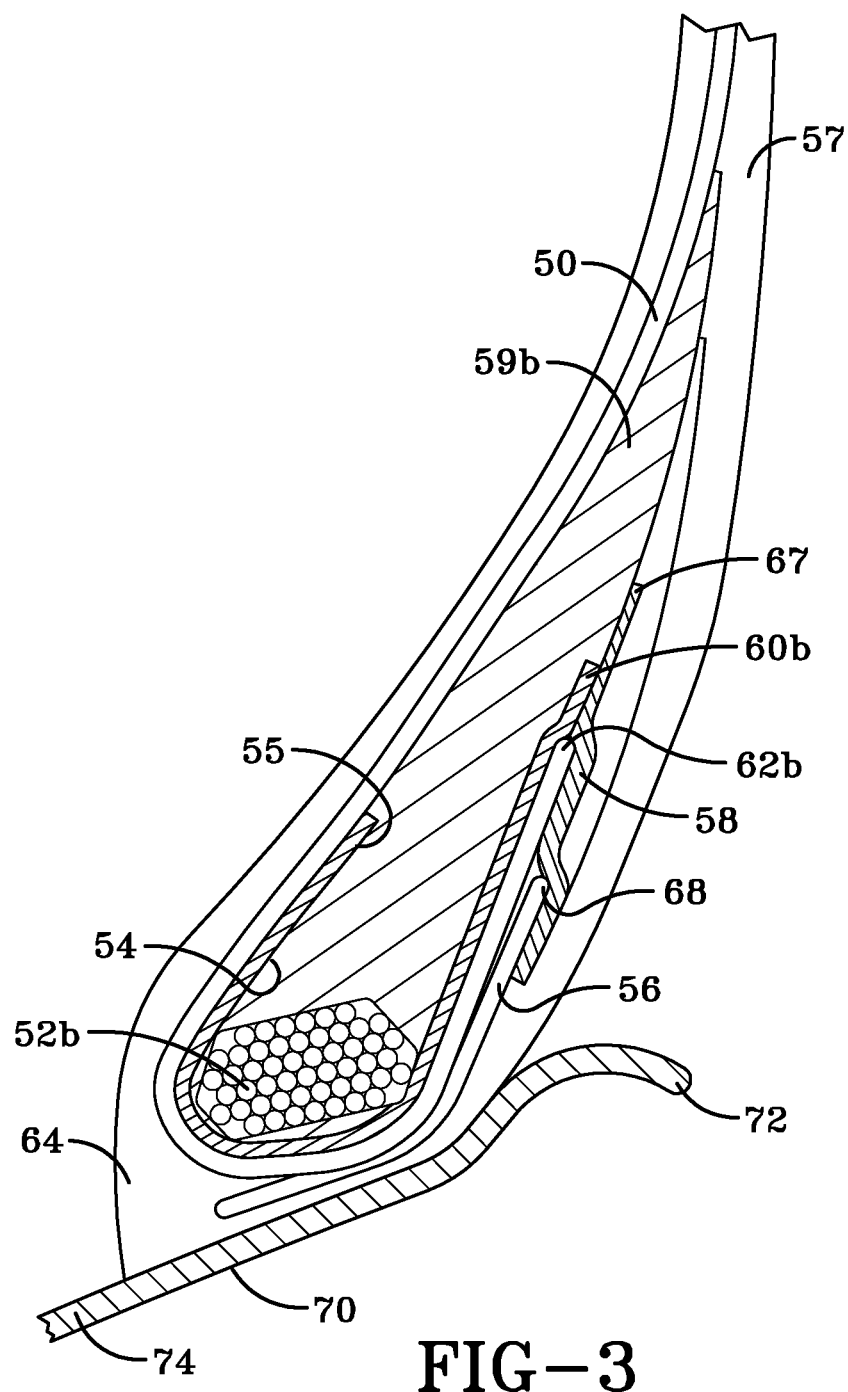
FIG. 3 represents a schematic detail view of another bead region for use with present invention.

FIG. 3 shows, in cross-sectional view, the bead region of another example tire for use with the reinforcing components in accordance with the present invention. A carcass ply 50 wraps around a bead 52b and is separated from the bead by a flipper 54. The flipper 54 may be a layer of fabric disposed around the bead 52b and inward of a portion of the carcass ply 50 which turns up under the bead. The flipper 54 may have physical properties (such as shearing modulus of elasticity) intermediate to those of a rigid metal bead 52b and a less rigid carcass ply 50. The flipper 54 therefore may serve as an active strain-relieving layer separating the bead 52*b* from the carcass ply 50. The carcass ply 50 may be reinforced with metal.

The example tire of FIG. 3 also may have a chipper 56 located in the bead area for reinforcing the bead area and stabilizing the axially inwardmost part of the sidewall 57. The flipper 54 and chipper 56, along with the patch 58 uniting them, are discussed separately below, and then in operational conjunction with one another.

The flipper 54 wraps around the bead 52*b* and extends radially outward into the sidewall regions of the example tire. The axially inward portion 55 of the flipper 54 terminates within the bead-filler apex 59*b*. The axially outward portion 60*b* of the flipper 54 lies radially beyond a turnup end 62*b*, which itself is located radially beyond the radially outermost reach of the chipper 56 (discussed separately below). The axially outwardmost portions 62*b* of the turnup end 62*b* of the carcass ply 50 may extend radially outward about 15-30 millimeters beyond the top of a wheel rim flange 72 of a wheel rim 70.

As shown in FIG. 3, the flipper 54 may be deployed about the bead 52*b* which is itself circumferentially disposed within the example tire. An axially inward portion 55 of the flipper 54 may extend radially outward from the bead 52*b* to a location approximately axially adjacent to the top of the wheel rim flange 72 of the wheel rim 70. On an axially outward side, the flipper 54 may extend radially outward from the bead 52*b* to an end 60*b* above the wheel rim flange 72. The radially outermost reach of the end 60*b* of the flipper 54 may extend between about 7-15 millimeters beyond the radially outermost reach of the turnup end 62*b*. The flipper 54 may be termed "active" because it actively absorbs (i.e. during tire deflection) differential strains between the relatively rigid bead 52*b* and the relatively less rigid carcass ply 50.

The chipper 56 may be disposed adjacent to the portion of the carcass ply 50 that is wrapped around the bead 52*b*. More specifically, the chipper 56 may be disposed on the opposite side of the portion of the carcass ply 50 from the flipper 54. The axially inwardmost portion of the chipper 56 lies in the portion of the bead region that, when the tire is mounted on the wheel rim 70, would lie closest to a circularly cylindrical part 74 of the wheel rim. The axially and radially outwardmost portion of the chipper 56 lies in the portion of the bead region that, when the tire is mounted on the wheel rim 70, would lie axially inward of the circular portion of the wheel rim 70, being separated from the circular portion of the wheel rim by tire rubber such as a toe guard 64.

In other words, as can be seen in FIG. 3, the chipper 56 is disposed circumferentially about the radially inwardmost portion of the carcass ply 50 where the carcass ply turns up under the bead 52*b*. The chipper 56 may extend radially outward, being more or less parallel with the turned up end 62*b* of the carcass ply 50.

The chipper 56 protects the portion of the carcass ply 50 that wraps around the bead 52*b* from the strains in the rubber that separates the chipper from the wheel rim 70. The chipper 56 reinforces the bead area and stabilizes the radially inwardmost part of the sidewall 57. In other words, the chipper 56 may absorb deformation in a way that minimizes the transmission of stress-induced shearing strains that arise inward from the wheel rim 70, through the toe guard 64, to the turned up portion 62*b* of the carcass ply 50, where the chipper is most immediately adjacent to the rigid bead 52*b*.

The patch 58 shown in FIG. 3 is circumferentially disposed about the bead 52*b* in such a way as to overlie the radially outermost regions 68 of the chipper 56 and the turned up ends 62*b* of the carcass ply 50. The patch 58 performs a function similar to that of those of the chipper 56 and the active flipper 54. More specifically, the patch 58 may absorb shearing stresses in the rubber parts which might otherwise induce separation of the flexible rubber from the less flexible material of the chipper 56 and the carcass ply 50. The patch 58 may, for example, be made of nylon fabric. The radially outwardmost portion 67 of the patch 58 may reach to a minimum level such as extending by at least 5 mm above the upper end 60*b* of the flipper 54, and preferably 10-15 mm above. The radially inwardmost portion of the patch 58 may overlap about 10 mm with the chipper 56.

The net effect of the incorporation of the flipper 54 and the chipper 56 is to provide strain buffers that relieve or absorb differential shearing strains that otherwise, were the flippers and chippers not present, could lead to separation of the adjacent materials that have disparate shearing moduli of elasticity. Furthermore, this reinforced construction may increase durability of the tire by means of the incorporation of a smaller number of components than for standard constructions with gum strips.

In accordance with the present invention, some of the structures described above, such as the belts 18, 20, apexes 26*a*, 26*b*, flippers 32*a*, 32*b*, 54, chippers 56, patch 58, and toeguard 64, may be constructed of a three dimensional fabric. Such structures may be significantly lighter, but still have sufficient strength and stiffness to meet or exceed tire performance requirements. This approach may thus achieve significant weight reduction and be less dependent on rubber by replacing rubber in these structures with the spaces or cells of the fabric construction. The three dimensional fabric may be woven or knitted from high performance fibers.

These fibers may be constructed as a single component, from such materials as carbon fiber, glass fiber, basalt fiber, and/or other suitable high performance fibers or of multi component fibers consisting of a combination of these materials. The light weight and enhanced mechanical properties of these fibers may allow for many design improvements effecting cost, weight, rolling resistance, etc. Thickness of deck layers, roll width, density, and height of vertical piles may be adjusted to meet various tire requirements. The cells between 2 deck layers may be filled with light weight material, wires, tubes, foam, sealant material, sensors, etc.

Non-tire applications of the three dimensional fabric have demonstrated excellent mechanical properties at very light weights. Such structures may further enhance structural stability of pneumatic tires without adding weight or increasing hysteresis. Such structures may additionally decrease hysteresis.

Figure 4:
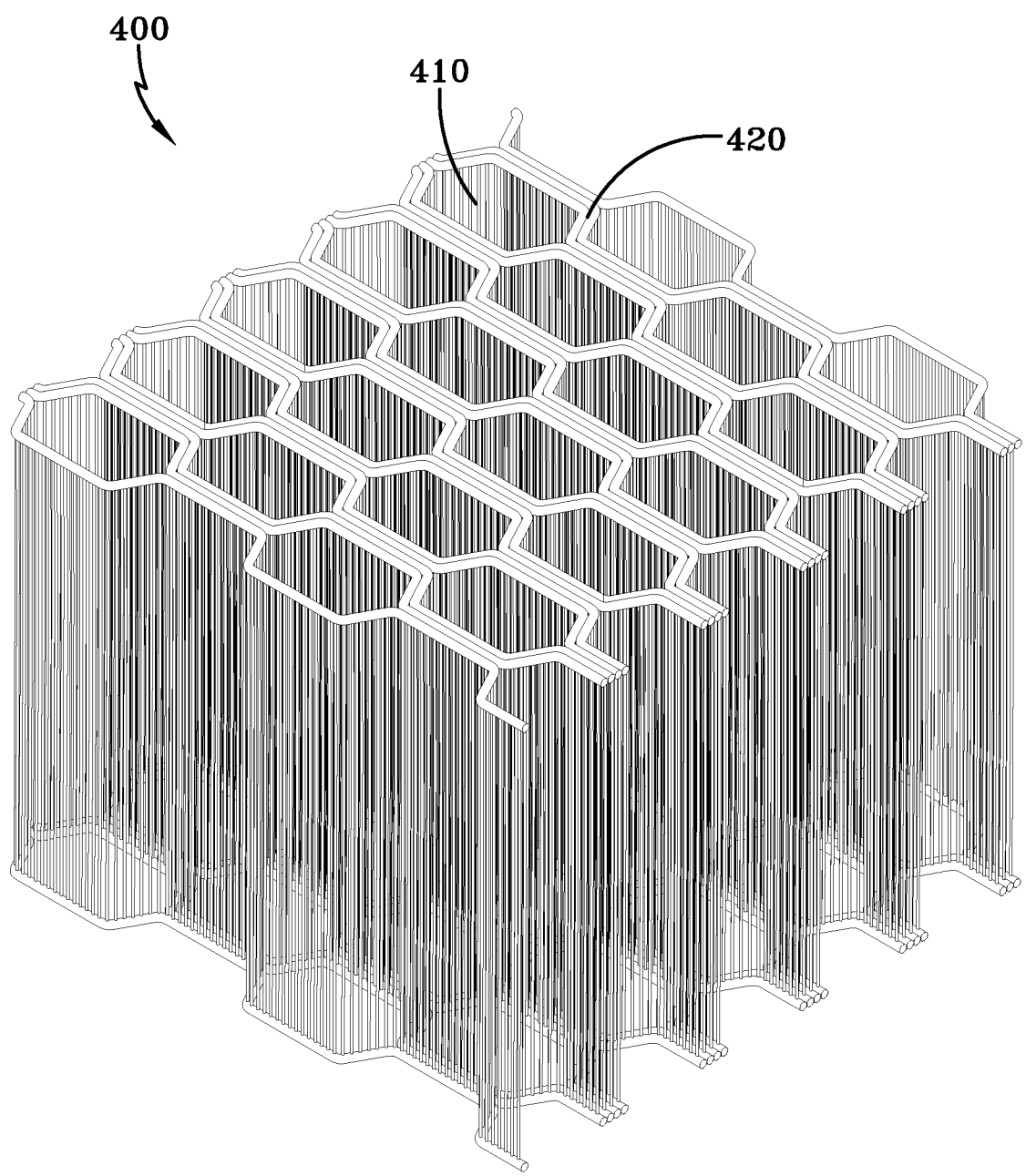
FIG. 4 represents a schematic detail of an example three dimensional fabric in accordance with the present invention.
Figure 5:
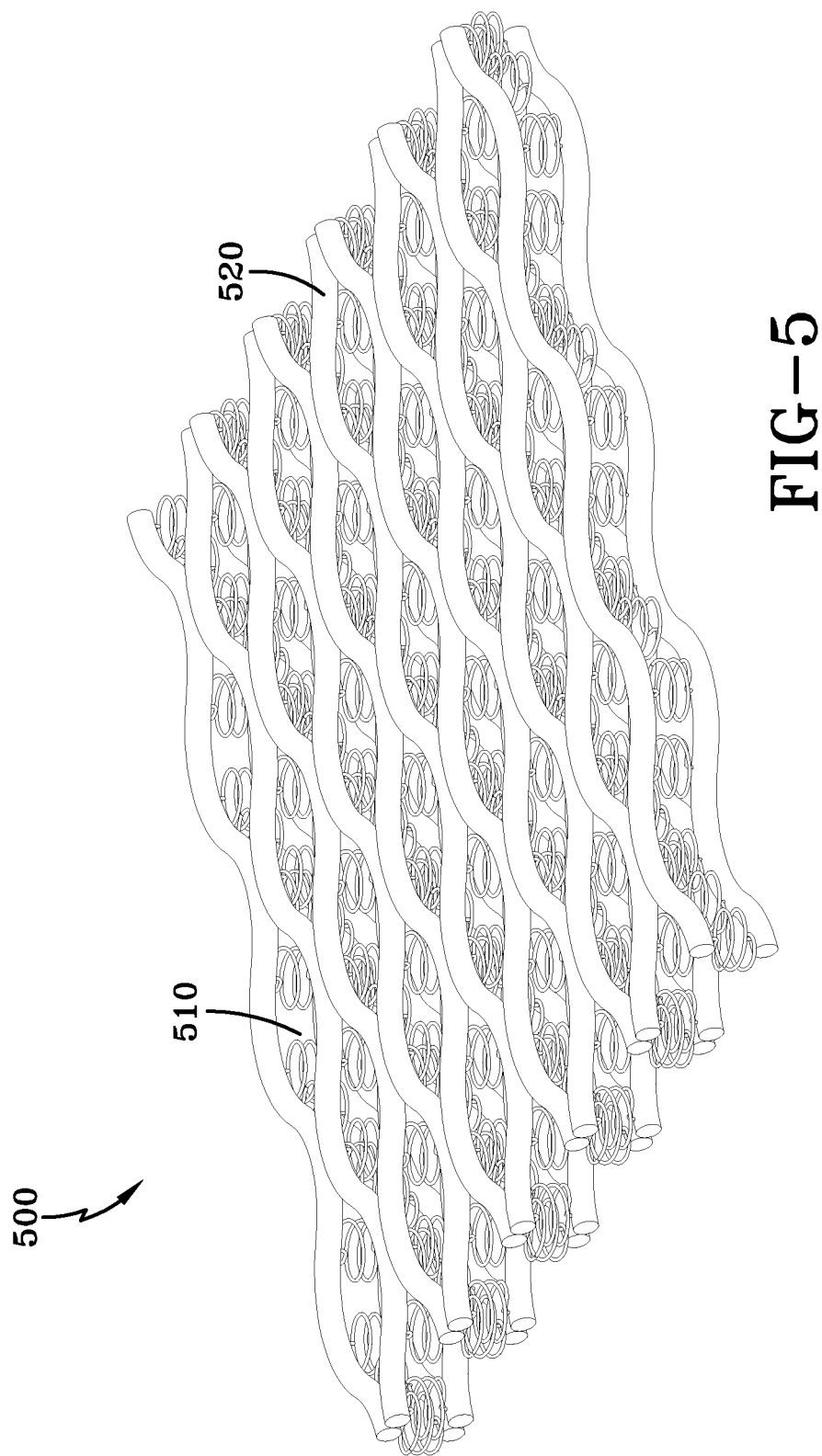
FIG. 5 represents a schematic detail of another example three dimensional fabric in accordance with the present invention.

The materials and material properties of textile reinforced composite structures may be specially customized for particular load situations by modifying the fiber material and/or architecture. For example, one five centimeter cube 400 of a three dimensional fabric may weigh only 6.5 grams (FIG. 4). The cube 400 may have a plurality of open cells 410 defined by the three dimensional structure of the fabric 420. Another example structure may be five centimeters by five centimeters by 0.7 centimeters and weigh 1.1 grams (FIG. 5). A conventional chipper compound of the same dimensions may weigh 30.0 grams. The structure 500 may have a plurality of open cells 510 defined by the three dimensional structure of the fabric 520.

Figure 6:
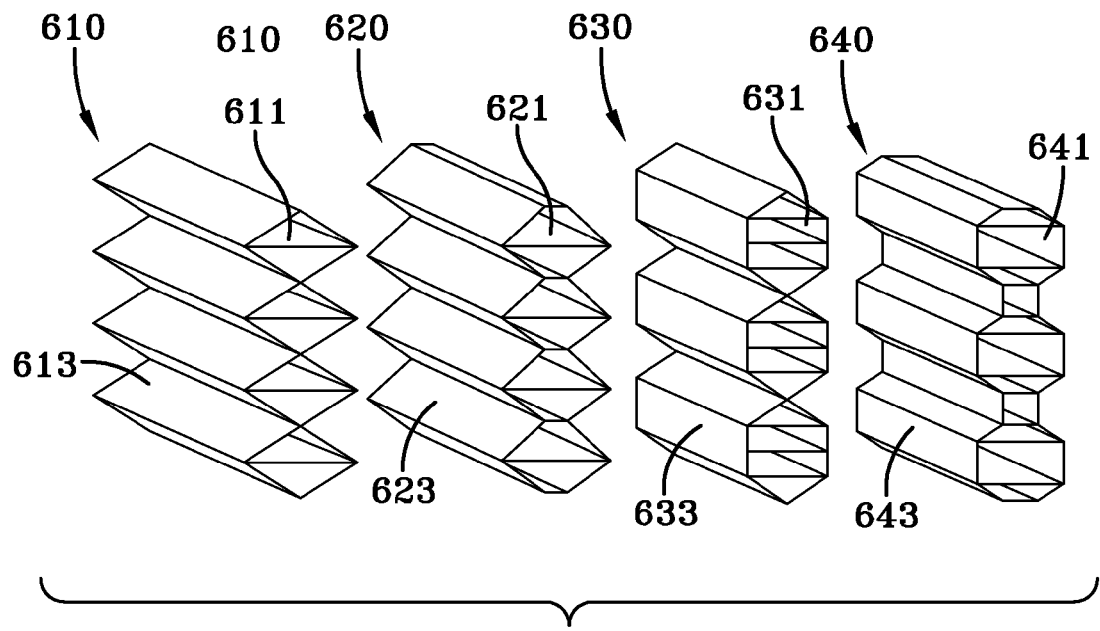
FIG. 6 represents a schematic detail of still another example three dimensional fabric in accordance with the present invention.

FIG. 6 shows four example hexagonal constructions 610, 620, 630, 640 that may be used as belts 18, 20, apexes 26*a*, 26*b*, flippers 32*a*, 32*b*, 54, chippers 56, patches 58, and/or toeguards 64 in a pneumatic tire. The constructions 610, 620, 630, 640 may have a plurality of open cells 611, 621, 631, 641 defined by the three dimensional structure of the fabric 613, 623, 633, 643.

Figure 7:
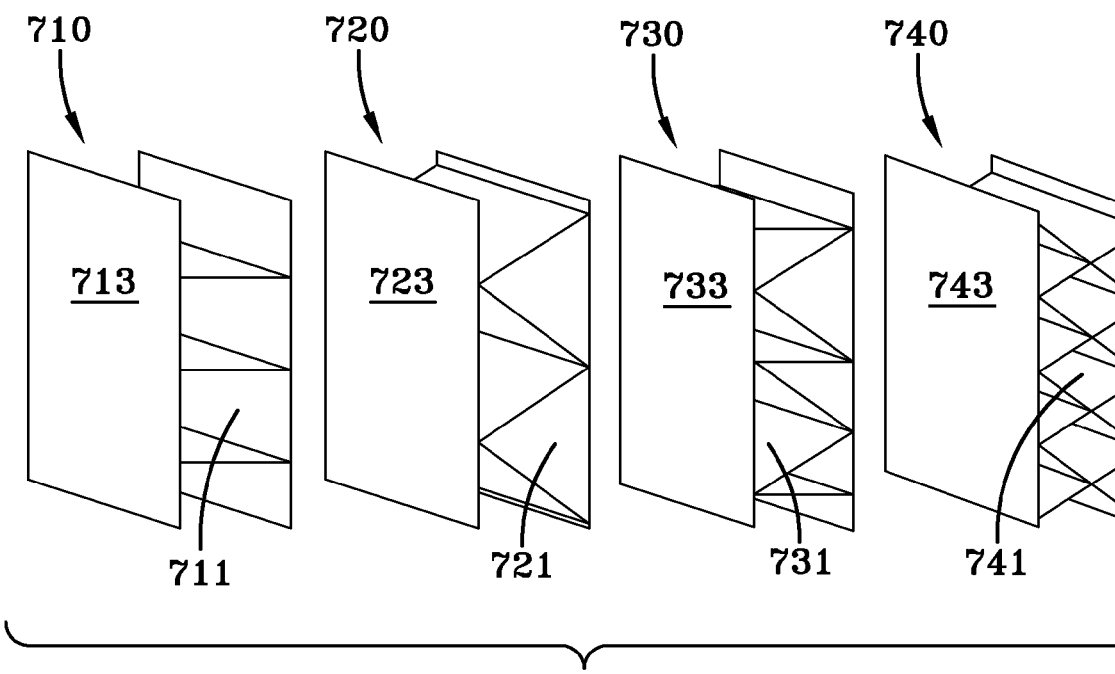
FIG. 7 represents a schematic detail of yet another example three dimensional fabric in accordance with the present invention.

FIG. 7 shows four example three plane constructions 710, 720, 730, 740 that may be used as belts 18, 20, apexes 26a, 26b, flippers 32a, 32b, 54, chippers 56, patches 58, and/or toeguards 64 in a pneumatic tire. The constructions 710, 720, 730, 740 may have a plurality of open cells 711, 721, 731, 741 defined by the three dimensional structure of the fabric 713, 723, 733, 743.

Figure 8:
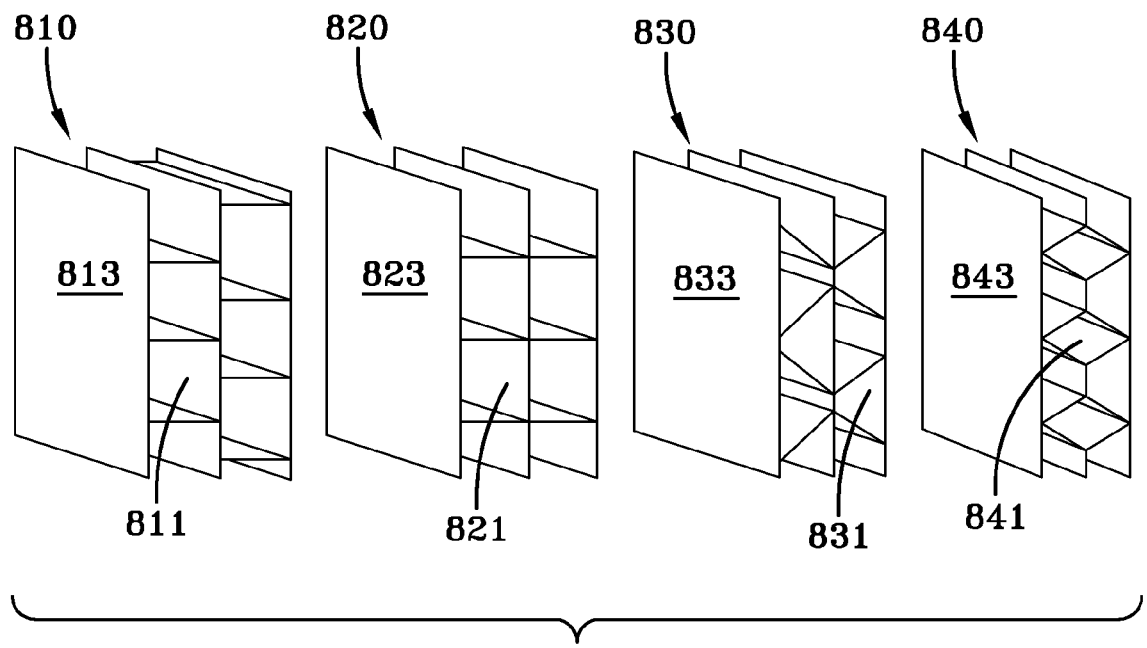
FIG. 8 represents a schematic detail of still another example three dimensional fabric in accordance with the present invention.

FIG. 8 shows four example two plane constructions 810, 820, 830, 840 that may be used as belts 18, 20, apexes 26a, 26b, flippers 32a, 32b, 54, chippers 56, patches 58, and/or toeguards 64 in a pneumatic tire. The constructions 810, 820, 830, 840 may have a plurality of open cells 811, 821, 831, 841 defined by the three dimensional structure of the fabric 813, 823, 833, 843.

Figure 9:
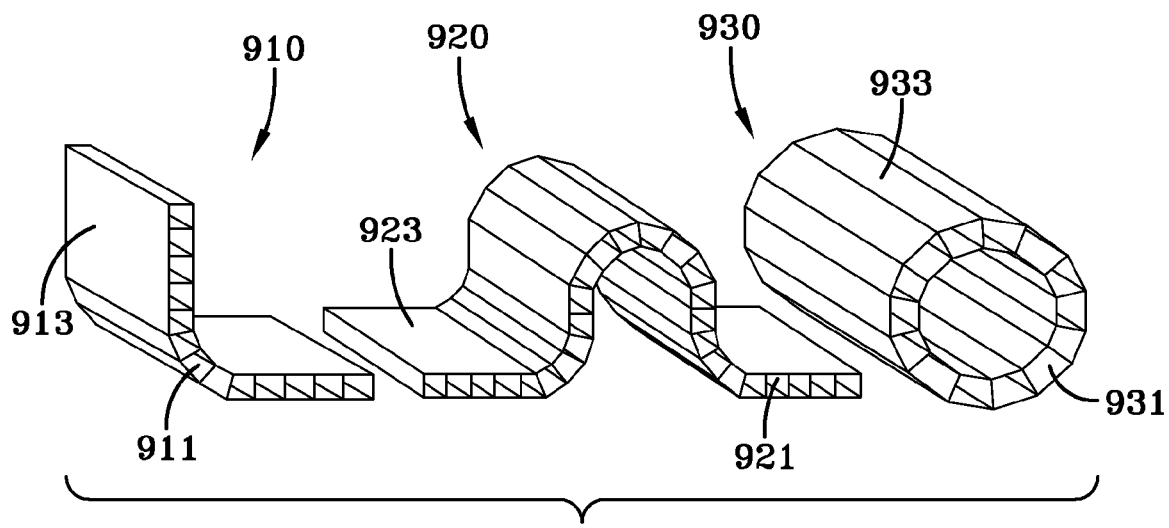
FIG. 9 represents a schematic detail of yet another example three dimensional fabric in accordance with the present invention.

FIG. 9 shows three example curved constructions 910, 920, 930 that may be used as belts 18, 20, apexes 26a, 26b, flippers 32a, 32b, 54, chippers 56, patches 58, and/or toeguards 64 in a pneumatic tire. The constructions 910, 920, 930 may have a plurality of open cells 911, 921, 931 defined by the three dimensional structure of the fabric 913, 923, 933.

Figure 10:
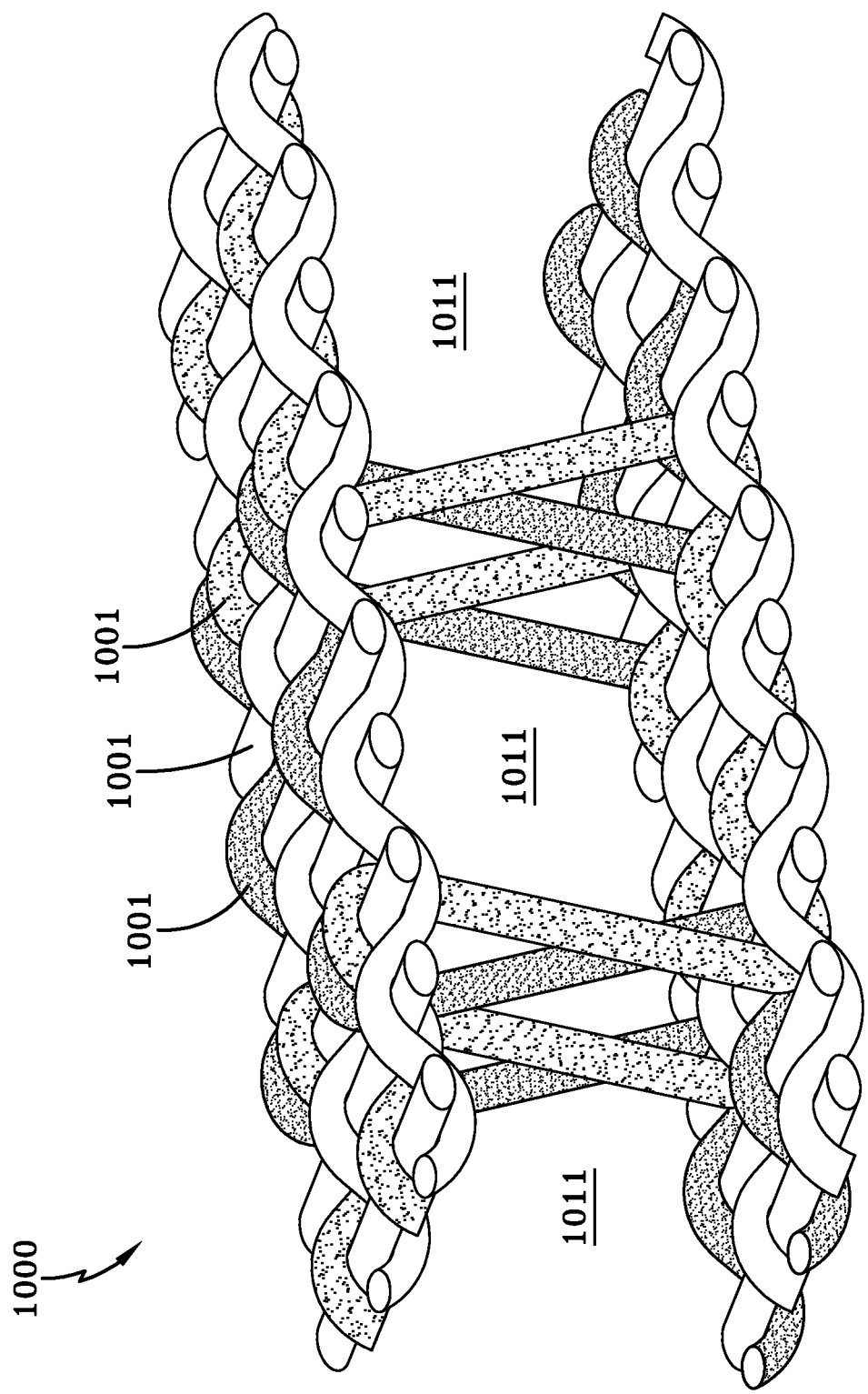
FIG. 10 represents a schematic detail of still another example three dimensional fabric in accordance with the present invention.

FIG. 10 shows an enhanced view of an example construction 1000 detailing the interrelationships of individual fibers 1001. The construction 1000 may have a plurality of open cells 1011 defined by the three dimensional structure of the fabric 1001.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having an axis of rotation, the pneumatic tire comprising:
   a carcass having at least one reinforced ply and a reinforcing structure providing a buffer for absorbing shear strain;
   a tread disposed radially outward of the carcass; and
   a belt structure disposed radially between the carcass and the tread, the reinforcing structure comprising a flipper with two layers of a three dimensional fabric including a frame structure of fabric and open cells defined by the frame structure, the flipper having physical properties intermediate to those of a rigid metal bead and a less rigid reinforced ply, the flipper serving as an active strain-relieving layer separating the rigid metal bead from the reinforced ply, the flipper surrounding the rigid metal bead.

2. The pneumatic tire of claim 1 wherein the fabric has warp yarns of 940/1 dtex polyaramide and weft yarns of 1220/1 dtex rayon.

3. The pneumatic tire of claim 2 wherein the warp yarns have a density of 14 EPI and the weft yarns have a density of 12 EPI.

4. The pneumatic tire of claim 1 wherein the fabric has warp yarns with a density of 14 EPI and weft yarns have a density of 12 EPI.

5. The pneumatic tire of claim 1 wherein the fabric comprises an open weave tape.

6. The pneumatic tire of claim 5 wherein outside edges of the open weave tape has a pair of warp yarns continuous for the radial length of the open weave tape.

7. The pneumatic tire of claim 6 wherein the open weave tape further comprises an adhesion promoter disposed thereon.

8. The pneumatic tire of claim 1 wherein the reinforcing structure is a flipper having two or more layers of open weave tape.

9. The pneumatic tire of claim 8 wherein the flipper includes warp yarns of at least two fibers of different fiber materials.

* * * * *